United States Patent [19]

Wessel et al.

[11] 4,352,032
[45] Sep. 28, 1982

[54] APPARATUS FOR COMPUTING THE QUOTIENT OF TWO INDUCTANCES IN AN AUTOMOTIVE CONTROL ELEMENT POSITION SENSOR

[75] Inventors: Wolf Wessel, Oberriexingen; Gerhard Engel, Stuttgart, both of Fed. Rep. of Germany

[73] Assignee: Robert Bosch GmbH, Stuttgart, Fed. Rep. of Germany

[21] Appl. No.: 195,387

[22] Filed: Oct. 9, 1980

[30] Foreign Application Priority Data

Nov. 3, 1979 [DE] Fed. Rep. of Germany ....... 2944502

[51] Int. Cl.³ .............................................. G06G 7/00
[52] U.S. Cl. .................................. 307/515; 307/490; 307/314; 328/161
[58] Field of Search ............... 307/228, 314, 490, 494, 307/515, 529, 10 R; 328/161

[56] References Cited

U.S. PATENT DOCUMENTS 3,225,289 12/1965 Koppel et al. ...................... 307/314
3,575,616 4/1971 Jordan ................................ 307/515
3,654,424 4/1972 Vanderhelst ........................ 328/161
3,697,778 10/1972 Olson .................................. 307/490

*Primary Examiner*—John S. Heyman
*Attorney, Agent, or Firm*—Frishauf, Holtz, Goodman & Woodward

[57] ABSTRACT

The ratio of the inductance of a measuring coil to that of a reference coil is formed by an operational amplifier. Specifically, the measuring coil is connected between the output and the inverting input of the operational amplifier, the reference coil being connected to the inverting input. An AC voltage having substantially symmetrical half waves is applied to the reference coil. The AC voltage is a triangular voltage generated by two additional operational amplifiers. An emitter-follower connected to the output furnishing the triangular voltage decreases the load on the operational amplifiers and therefore allows the connection of a multiplicity of computing stages to the one source of triangular voltage. Additional operational amplifier stages, in conjunction with diodes, constitute a full wave rectifier and filter for the output of the operational amplifier furnishing the ratio signal.

9 Claims, 3 Drawing Figures

APPARATUS FOR COMPUTING THE QUOTIENT OF TWO INDUCTANCES IN AN AUTOMOTIVE CONTROL ELEMENT POSITION SENSOR

CROSS REFERENCE TO RELATED APPLICATIONS AND PUBLICATIONS

The present invention relates to circuits for computing the quotient indicative of a ratio of inductances signifying the position of a control member in an internal combustion engine. The so-sensed position may be a rotational (angular) position or a position along a predetermined path. In particular, it relates to motor vehicles in which the quotient is computed as the ratio of two inductances, namely a ratio of the inductance of a measuring coil which varies as a function of the position of the control element to that of a reference coil with a fixed inductance.

Background and Prior Art

In known apparatus of this type, an iron core carries a reference coil with a fixed inductivity. Further, it carries a measuring coil having a measuring inductance which varies as a function of the position, angular or linear, of a control element with respect to a reference position. The variation of the measuring inductance is a function of the position of a short-circuiting ring relative to the iron core.

The Invention

It is an object of the present invention to furnish a very simple computing circuit for computing the ratio of the variable inductance to the fixed inductance.

In accordance with the present invention, first operational amplifier means are provided. The measuring coil is connected between the output and the inverting input of the operational amplifier means, the reference coil also being connected to the inverting input. A periodically increasing and decreasing voltage is applied to the reference coil. Preferably, the periodically increasing and decreasing voltage is a triangular voltage having at least approximately symmetrical half waves.

DRAWINGS ILLUSTRATING A PREFERRED EMBODIMENT

Figure 1:
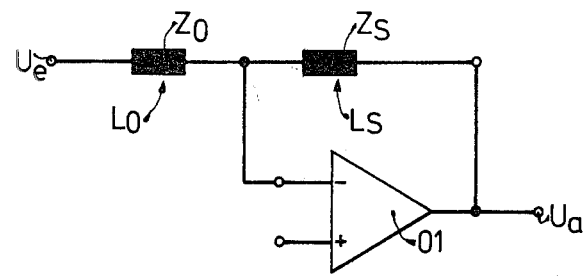
FIG. 1 is a circuit diagram, partially in block form, illustrating the basic quotient deriving circuit.

The basic circuit for computing the ratio of a variable inductance Ls of a measuring coil Zs relative to the fixed inductance Lo of a reference coil Zo, both being mounted on the same iron core is shown in FIG. 1. As shown in FIG. 1, the measuring inductance Zs is connected between the output of an operational amplifier O1 and its inverting input. One end of reference coil Zo is also connected to the inverting input of operational amplifier O1, while its other end is connected to a source of a periodically increasing and decreasing voltage Ue. The voltage at the output of operational amplifier O1, Ua, has the same ratio to input voltage Ue as the variable inductance Ls has to the reference inductance Lo:

$$\frac{Ua}{Ue} = -\frac{Ls}{Lo}.$$

Figure 2:
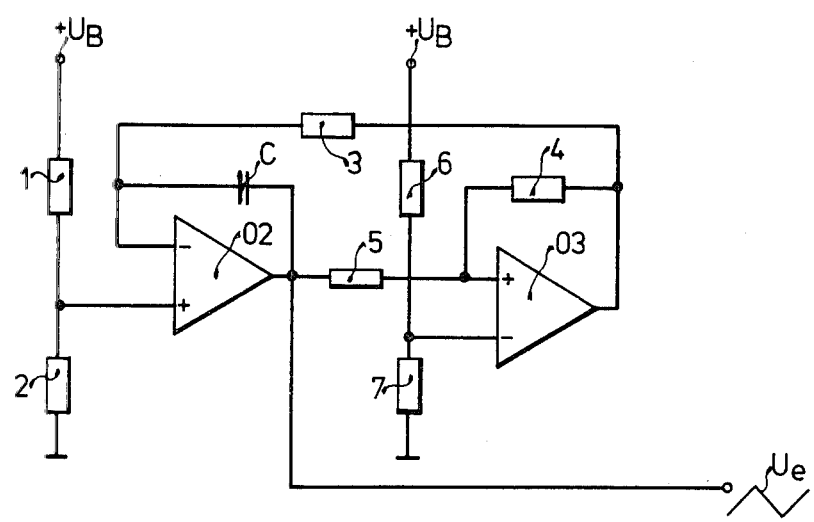
FIG. 2 illustrates the circuit for deriving a periodically increasing and decreasing voltage for application to the circuit shown in FIG. 1.

The preferred shape of voltage Ue is shown in FIG. 2. It will be noted that it is a triangular voltage having symmetrical half waves. The circuits for generating this voltage are also shown in FIG. 2. Specifically, a second operational amplifier O2 is provided. Operational amplifier O2 has an output which furnishes the triangular voltage Ue. The output of operational amplifier O2 is connected to its inverting input by a capacitor C. A direct input of operational amplifier O2 is connected to the voltage divider tap of a voltage divider including resistors 1 and 2. The operating voltage UB is applied across resistors 1 and 2. The inverting input of operational amplifier O2 is connected through a resistor 3 to the output of a third operational amplifier O3 which acts as a comparator. Preferably, operational amplifier O3 operates with little residual voltage. The output of operational amplifier O3 is connected to its direct input by a resistor 4. A resistor 5 is connected between the direct input of operational amplifier O3 and the output of operational amplifier O2. The inverting input of operational amplifier O3 is connected to the tap of a voltage divider including resistors 6 and 7. The operating voltage UB is applied across resistors 6 and 7.

The triangular alternating voltage furnished by operational amplifier O2 has a straight line variation between the values of the operating voltage UB and the value represented by the voltage at the tap of the voltage divider comprising resistors 6 and 7. The amplitude of voltage Ue is independent of the load applied to the circuit, but proportional to the operating voltage UB. Thus, it is not necessary to control the amplitude of the operating voltage. The output voltage Ue of first operational amplifier O1 is then proportional to the measuring inductance Ls, as well as to the operating voltage.

Figure 3:
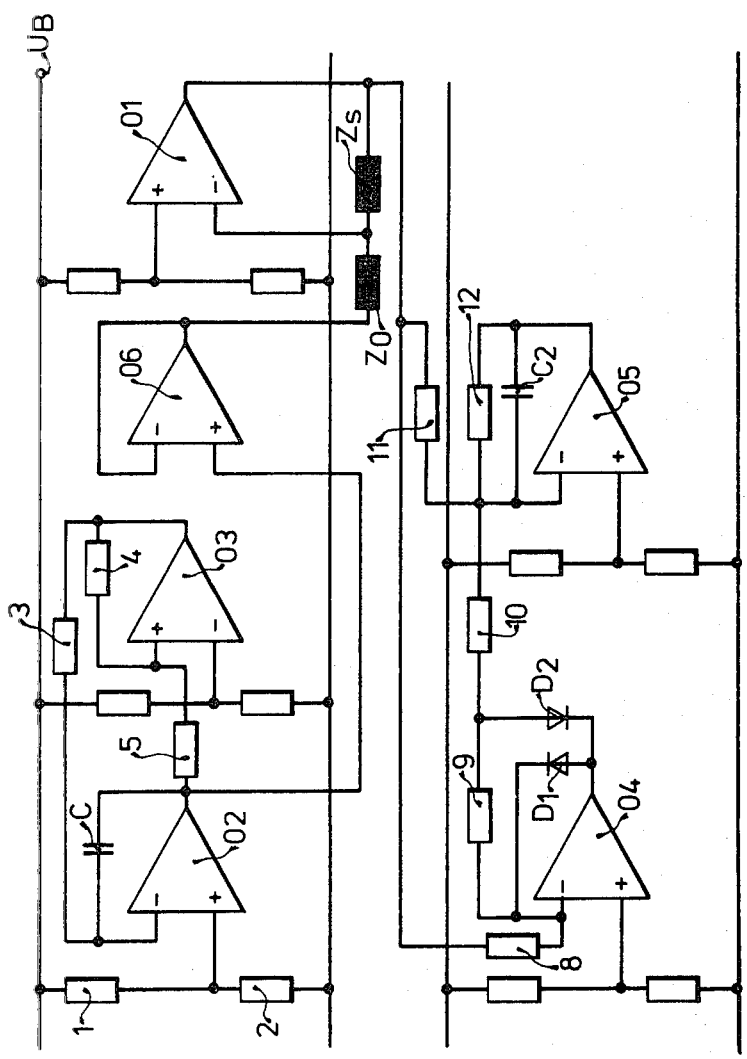
FIG. 3 shows the circuits of FIGS. 1 and 2 with additional rectifying and filter circuits.

An ideal full wave rectifier with a smoothing capacitor would then furnish a DC voltage proportional to the position, linear or angular, of the control element and independent of temperature and of changes in the magnetic field resulting from changes in the value determining the desired path. FIG. 3 shows the complete circuit of a preferred embodiment of the present invention. This includes circuits of FIGS. 1 and 2. The same elements have the same reference numerals in all Figures. Besides the circuits shown in FIGS. 1 and 2, FIG. 3 includes a full wave rectifier consisting of an operational amplifier O4 whose inverting input is connected through a resistor 8 to the output of the first operational amplifier O1. Two diodes, D1 and D2, are connected to the output of fourth operational amplifier O4, but with opposite polarity. Specifically, diode D1 has an anode connected to the output and a cathode connected to the inverting input of operational amplifier O4, the cathode of diode D2 also being connected to the output of operational amplifier O4. The anode of diode D2 is connected through a resistor 9 to the inverting input of operational amplifier O4. A fifth operational amplifier O5 is provided for adding the other half wave and for smoothing both rectified half waves. The inverting input of operational amplifier O5 is connected through a resistor 10 to diode D2 and through a resistor 11 to the output of operational amplifier O1. It is further connected through a resistor 12 and a capacitor C2 connected in parallel with resistor 12 to the output of operational amplifer O5. The resistance value of resistor 11 must be twice that of resistor 10, while resistors 8 and 9 must have the same resistance. Under these conditions, both half waves are applied to summing point O5 with the same amplitude. The output voltage of operational amplifier O5 is then a DC voltage U whose amplitude is proportional to the ratio of inductances Ls/Lo, that is proportional to the value being measured.

It is a particular advantage of the quotient computing circuit described above, that the output voltage is linear with respect to the variable inductance Ls over a wide inductance range, any temperature or magnetic field changes having practically no effect whatsoever.

Emitter-follower O6 is connected to the output of operational amplifier O2 in order to decrease the load thereon. The emitter-follower consists of an operational amplifier O6 whose direct input is directly connected to the output of operational amplifier O2, while its inverting input is directly connected both to its output and to reference coil Zo. Because of this emitter-follower, it is possible to connect additional quotient computing circuits of the type illustrated as operational amplifier O1 to the triangular voltage source O2. These additional computing circuits would, of course, also compute the quotient between the inductance of a measuring coil and an associated reference inductance.

Various changes and modifications may be made within the scope of the inventive concepts.

We claim:

1. In a motor vehicle having a control member and sensor means for furnishing a first signal indicative of the position of said control member relative to a fixed position, said sensor means comprising an iron core, a reference coil having a fixed inductance, a measuring coil, and a short-circuiting ring movable with respect to said iron core for varying the inductance of said measuring coil:

apparatus for furnishing a quotient signal corresponding to the ratio of said inductance of said measuring coil to said fixed inductance, comprising
first operational amplifier means (O1) having a direct input, an inverting input and an output;
means for interconnecting said measuring coil between said inverting input and said output;
means for connecting said reference coil ($Z_O$) to said inverting input; and
means (O2, O3) for applying a periodically increasing and decreasing voltage to said reference coil.

2. Apparatus as set forth in claim 1, wherein said periodically increasing and decreasing voltage is a triangular voltage (Ue) having at least approximately symmetrical half-waves.

3. Apparatus as set forth in claim 2, wherein said means for furnishing said triangular voltage comprises second operational amplifier means having an inverting input, a direct input and an output;
a capacitor (C) interconnected between said output and said inverting input of said second operational amplifier means, whereby said second operational amplifier means constitutes an integrator;
third operational amplifier means (O3) having a direct input connected to said output of said second operational amplifier means, an inverting input and an output;
means ($U_B$, 6, 7) for applying a fixed voltage to said inverting input of said third operational amplifier means; and
first and second resistance means (4, 3) for connecting said output of said third operational amplifier means to said direct input of said third operational amplifier means and to said inverting input of said second operational amplifier means, respectively.

4. Apparatus as set forth in claim 3, further comprising an emitter-follower circuit (O6) connected between said output of said second operational amplifier means and said reference coil.

5. Apparatus as set forth in claim 3, further comprising rectifier means (O4) connected to said output of said first operational amplifier means, and filter means (O5) connected to said rectifier means.

6. Apparatus as set forth in claim 5, wherein said rectifier means comprises a full wave rectifier.

7. Apparatus as set forth in claim 6, wherein said rectifier means comprises an operational amplifier, and a first and second diode (D1, D2) connected to said operational amplifier means constituting said rectifier means.

8. Apparatus as set forth in claim 7, wherein said filter means comprises operational amplifier means (O5) having an inverting input connected to said operational amplifier means constituting said rectifier means through a selected one of said diodes.

9. Apparatus as set forth in claim 1, further comprising means for furnishing an energizing voltage ($U_B$);
and wherein said periodically increasing and decreasing voltage is independent of the load on said means for furnishing said periodically increasing and decreasing voltage, but proportional to said operating voltage.

* * * * *